United States Patent
Trögl et al.

(10) Patent No.: US 9,249,928 B2
(45) Date of Patent: Feb. 2, 2016

(54) APPARATUS AND MOUNTING GANTRY FOR SUSPENDING A COMPONENT

(71) Applicant: Kapsch TrafficCom AG, Vienna (AT)

(72) Inventors: Arnold Trögl, Baden (AT); Leopold Hackl, Martinsberg (AT)

(73) Assignee: Kapsch TrafficCom AG, Vienna (AT)

( * ) Notice: Subject to any disclaimer, the term of this patent is extended or adjusted under 35 U.S.C. 154(b) by 391 days.

(21) Appl. No.: 13/946,472

(22) Filed: Jul. 19, 2013

(65) Prior Publication Data
US 2014/0020194 A1    Jan. 23, 2014

(30) Foreign Application Priority Data
Jul. 20, 2012    (EP) .................................... 12177340

(51) Int. Cl.
E01F 9/00 (2006.01)
F16M 13/02 (2006.01)
E01F 9/011 (2006.01)
E01D 18/00 (2006.01)

(52) U.S. Cl.
CPC ............. F16M 13/022 (2013.01); E01D 18/00 (2013.01); E01F 9/0113 (2013.01); Y10T 29/4984 (2015.01)

(58) Field of Classification Search
CPC . F16M 13/022; Y10T 29/4984; E01F 9/0113; E01D 18/00
USPC ...................... 404/9, 71, 72; 248/205.1; 14/78
See application file for complete search history.

(56) References Cited

U.S. PATENT DOCUMENTS

| | | | | |
|---|---|---|---|---|
| 3,070,337 A * | 12/1962 | Gates | ........................ | E04G 5/04 182/87 |
| 5,660,453 A * | 8/1997 | Lewis | .................. | G02B 6/0008 362/183 |
| 7,478,915 B1* | 1/2009 | Pedersen | ................. | G09F 13/02 362/145 |
| 8,756,874 B2* | 6/2014 | Hurlebaus | ............. | E01F 9/0113 52/223.8 |
| 2009/0190356 A1* | 7/2009 | Kauffman | ............... | F21S 8/081 362/282 |
| 2009/0290338 A1* | 11/2009 | Heller | ..................... | G09F 13/02 362/231 |
| 2015/0055324 A1* | 2/2015 | Elmore | .................. | G09F 13/14 362/97.1 |

FOREIGN PATENT DOCUMENTS

| | | |
|---|---|---|
| FR | 2831567 A1 | 5/2003 |
| WO | 98/35330 A1 | 8/1998 |
| WO | 2008/056017 A1 | 5/2008 |

OTHER PUBLICATIONS

Extended European Search Report received for application No. 12177340.2, mailed on Dec. 21, 2012, 5 pages.

\* cited by examiner

*Primary Examiner* — Raymond W Addie
(74) *Attorney, Agent, or Firm* — Fiala & Weaver P.L.L.C.

(57) ABSTRACT

A device for suspending at least one component from a gantry, and a gantry that includes such a device includes a guide rail that can be secured on the gantry in an approximately vertical orientation, a carriage that is guided on the guide rail in a sliding movable manner and on which the component can be mounted, and a limit stop that is mounted on the guide rail beneath the carriage in a height-adjustable manner. The guide rail is divided into a lower part and an upper part, which are connected to each other by way of a pivot connection having a pivot axis parallel to the longitudinal direction of the guide rail.

20 Claims, 4 Drawing Sheets

APPARATUS AND MOUNTING GANTRY FOR SUSPENDING A COMPONENT

CROSS-REFERENCE TO RELATED APPLICATION(S)

This application claims priority to European Patent Application No. 12 177 340.2, filed on Jul. 20, 2012, the entirety of which is incorporated by reference herein.

BACKGROUND

1. Technical Field

The present application relates to a device for suspending components, in particular cameras, radar devices, laser scanners or the like, from a gantry, which spans a road, for example. The application further relates to a gantry equipped with such a device.

2. Background Art

Gantries that span roads frequently carry heavy and complex components of the type mentioned above, which not only must be securely anchored in a suspended or salient position, but also require repeated cleaning, maintenance and adjustment. So as to gain temporary access to the components for these purposes, at present either the road must be blocked, or the maintenance staff must let themselves down from the gantry in a secured manner, or complicated mobile suspension constructions are required.

BRIEF SUMMARY

It is an object of the present application to overcome the drawbacks of the known art and create a simple, secure and maintenance-friendly solution for suspending a component from a gantry.

This object is achieved in a first aspect of the present application by a device of the type mentioned above, comprising:

a guide rail that can be secured on the gantry in an approximately vertical orientation;

a carriage, which is guided on the guide rail in a sliding movable manner and on which the component can be mounted; and a limit stop, which is mounted on the guide rail beneath the carriage in a height-adjustable manner;

wherein the guide rail is divided into a lower part and an upper part, which are connected to each other by way of a pivot connection having a pivot axis parallel to the longitudinal direction of the guide rail.

The component can thus be moved by way of the carriage from a lowered mounting and operating position into a raised maintenance, cleaning and adjustment position, in which it can be easily accessed or reached from the gantry, without the need for the operating staff to take safety measures for outside work on the gantry or requiring access from beneath and the resulting road block. The limit stop, which is mounted on the guide rail in a height-adjustable manner, defines the position of the carriage, and thus of the component, in the lowered mounting and operating position, which can thus be easily preselected and reproduced at any time. When the carriage is moved into the raised position on the upper part, the carriage can be pivoted together with the upper part, while the lower part remains rigidly secured to the gantry. The carriage can thus be pivoted into a position that faces the user by way of the gantry, which further facilitates access to the component for maintenance, cleaning and adjustment work.

The pivot axis of the pivot connection may be located outside the guide rail, so that the lower part and the upper part can be pivoted into and out of alignment, whereby the carriage that has been raised into the upper part can be pivoted even more closely toward the user.

It is particularly advantageous for the upper end of the guide rail to carry a block and tackle and/or a winding drum for a pull cable engaging on the carriage, which considerably facilitates the raising of the carriage.

According to a further embodiment, the guide rail comprises at least two laterally projecting flanges and the limit stop comprises at least two L- or U-shaped lugs, which embrace the flanges with play, wherein the limit stop includes at least one movable clamping element for locking the play. The limit stop can thus be fixed at the desired height so as to define the lowered position of the carriage with the component.

The clamping element may be a wedge, which is linearly guided in the limit stop so as to be seated against the guide rail and which is penetrated by a tension screw, which drives the wedge between a surface of the limit stop and the guide rail upon tightening. This allows the limit stop to be clamped at any arbitrary height quickly and securely. Because of the selected wedge shape, the limit stop is clamped at the desired height even without tightening of the tension screw; the tension screw amplifies the effect of the wedge-shaped clamping element and provides additional securing action.

It is particularly advantageous if the tension screw can be accessed from the top side of the limit stop. The limit stop can then be moved directly from the gantry during operation, for example for adjustment purposes.

According to a further advantageous embodiment, the guide rail comprises at least two laterally projecting flanges, and the carriage comprises at least four pairs of rollers, of which two pairs engage one flange and two pairs engage the other flange, respectively, and roll thereon. This results in very stable and precise guidance of the carriage, which allows exact orientation of the component, for example a camera or scanner.

It is particularly advantageous for the cross-section of the guide rail to be a double-T profile, wherein the limbs of the one T form the two flanges and the limbs of the other T can be secured to the gantry, resulting in high load-bearing strength and torsional rigidity.

One of the carriage and limit stop may have at least one centering hole, and the other of the carriage and limit stop may have at least one centering pin, which may be truncated cone-shaped and/or obliquely positioned, and which can be engaged in the hole. When the carriage is lowered onto the limit stop, this results in self-centering and self-adjustment of the carriage in a defined, reproducible position on the limit stop, simultaneously fixing the carriage by way of pressing against the guide rail. The oblique position of the centering pin increases the pressing action. The use of more than one centering pin allows additional fixation of the carriage to prevent rotation.

According to a further embodiment, the guide rail may also guide more than one carriage. To this end, the carriage can be coupled to another carriage by way of a centering coupling. The carriages can thus be lowered consecutively on top of one another, in each case centering one another against each other in defined, reproducible positions.

In a further aspect, a gantry is created, which is equipped with the device of the type described here, which is secured to the gantry by way of an approximately vertically oriented guide rail.

The gantry may have a walk-on catwalk that is secured by a lateral railing, wherein the guide rail runs vertically downward outside the railing. The guide rail can thus easily protrude downward beneath the catwalk or beneath the gantry so as to suspend the component or components, while the user can stand securely on the catwalk behind the railing.

It is particularly advantageous to use a two-piece guide rail that is equipped with a pivot connection for this purpose, wherein the pivot connection is located at or above the height of the railing and the lower part of the two-piece guide rail is secured to the gantry or the railing thereof. The upper part of the two-piece guide rail can thus be pivoted over the railing into the region above the catwalk, wherein the component can be easily accessed for maintenance, cleaning or adjustment purposes with the carriage that has been transferred to the upper part, without the user having to leave the secure catwalk.

The device according to the present application is suitable for any type of gantry and component. The gantry may be a gantry that spans the road for traffic monitoring purposes, and the component may be a camera, a radar device or a laser scanner.

BRIEF DESCRIPTION OF THE DRAWINGS/FIGURES

Embodiments will be described in more detail hereafter with reference to the accompanying drawings. In the drawings.

Embodiments will now be described with reference to the accompanying drawings.

DETAILED DESCRIPTION

Figure 1:
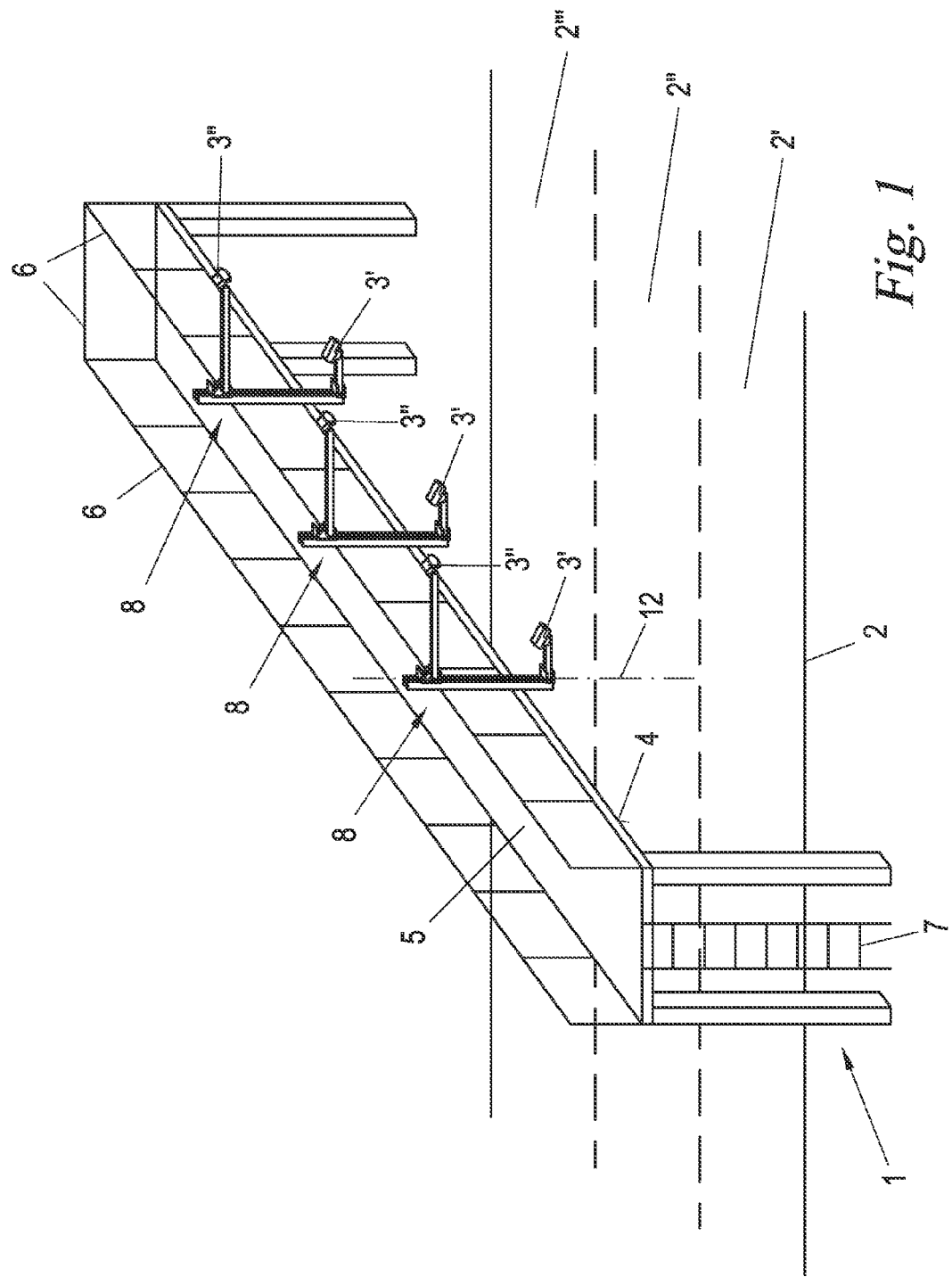
FIG. 1 shows a perspective overview of a gantry comprising a plurality of devices according to an example embodiment.

FIG. 1 shows a gantry 1, which spans a road 2 having one or more lanes 2', 2", 2'" and is used to suspend components 3 such as cameras 3', laser scanners 3", radar devices (not shown) or the like. The term "suspension" in the present description shall be understood to include projections or mountings at approximately the height of the gantry 1, which is to say the components 3 do not necessarily protrude downward below the underside 4 of the gantry 1, in particular if the gantry 1 has a large installation height h.

The gantry 1 has a catwalk 5, which is secured by one or more lateral railings 6. The catwalk 5 can be reached from the ground via a ladder 7.

The gantry 1 further has one or more devices 8 for anchoring or suspending one or more components 3, respectively. The devices 8 are secured to the gantry 1 laterally outside the railing 6 and one of the devices 8 is shown in detail in FIGS. 2, 3a, 3b, 4, 5a, and 5b.

Figure 2:
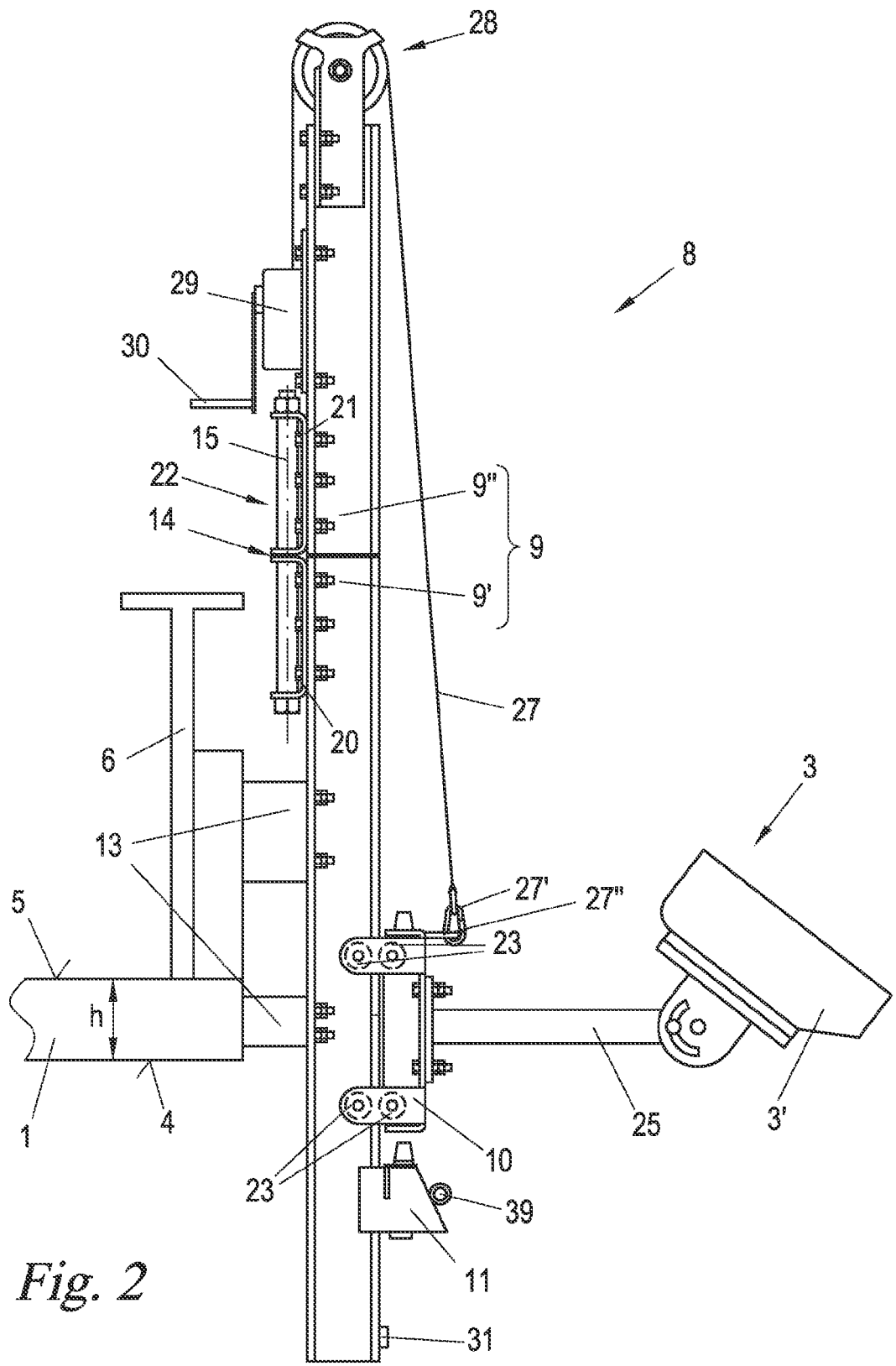
FIG. 2 is a side view of the devices of FIG. 1, according to an example embodiment.
Figure 4:
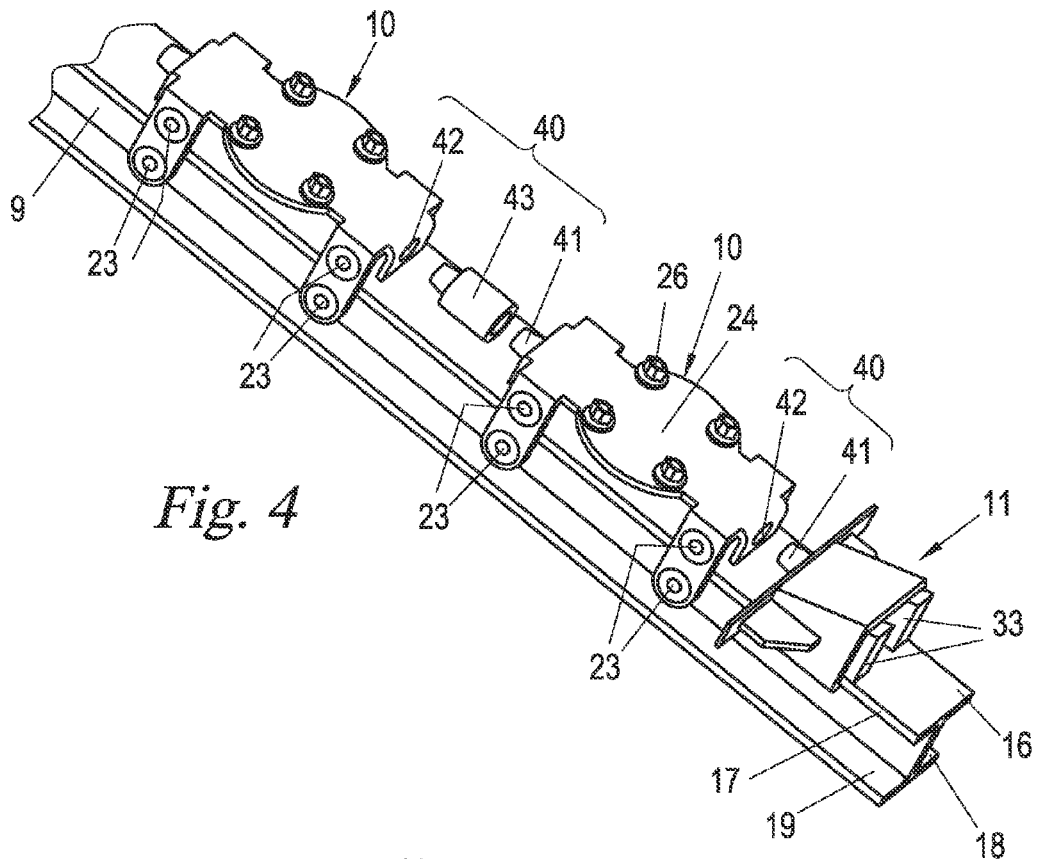
FIG. 4 shows a perspective view of a portion of the device of FIG. 2, according to an example embodiment.
Figure 5A:
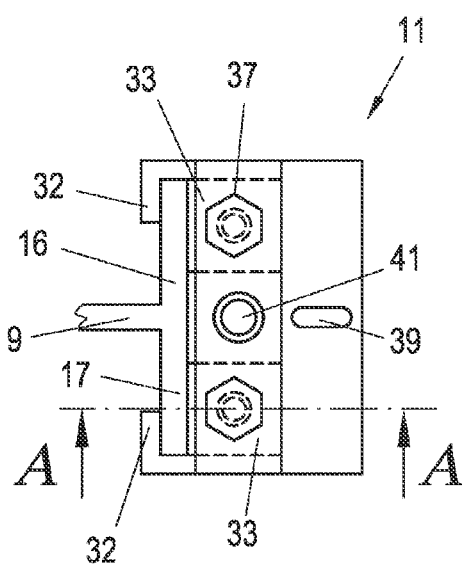
FIGS. 5a and 5b show a top view (FIG. 5a) and a sectional view (FIG. 5b) along the intersecting line A-A of FIG. 5a of the limit stop of the device of FIGS. 2 to 4, according to example embodiments.
Figure 5B:
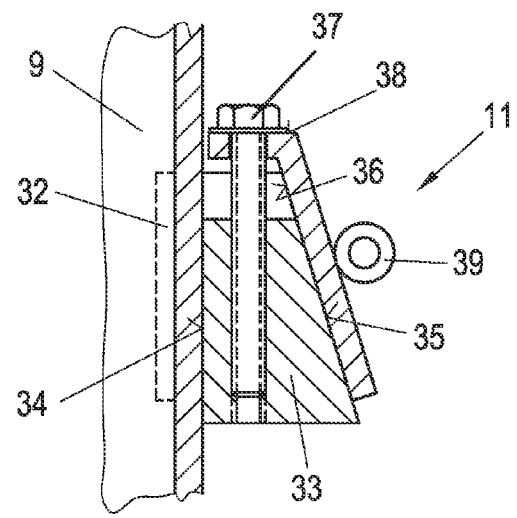

According to FIGS. 2 and 4, the device 8 comprises a guide rail 9, at least one carriage 10 guided thereon in a sliding movable manner, and a limit stop 11, which is mounted on the guide rail 9 beneath the carriage 10 in a height-adjustable manner (FIGS. 5a and 5b). The guide rail 9 is secured to the gantry 1 in an approximately vertical orientation, which is to say with the longitudinal and guide axis 12 (FIG. 1) in an approximately vertical position, for example by way of anchor brackets or anchoring pins 13 on the gantry 1 and/or the railing 6 thereof.

Figure 3A:
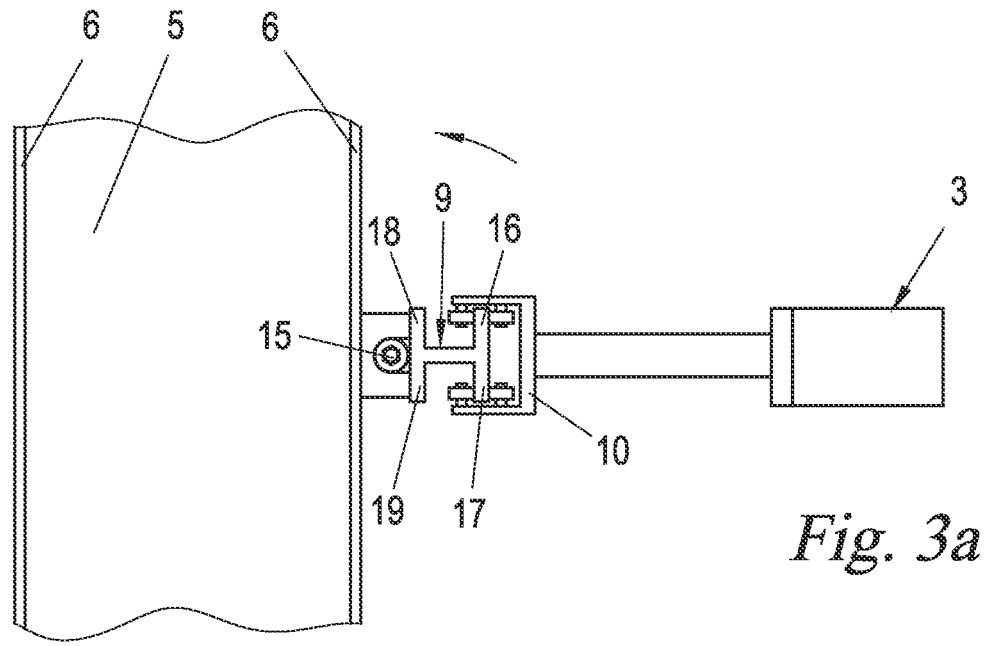
FIGS. 3a and 3b show top views onto the device of FIG. 2 in two different operating positions, according to example embodiments.
Figure 3B:
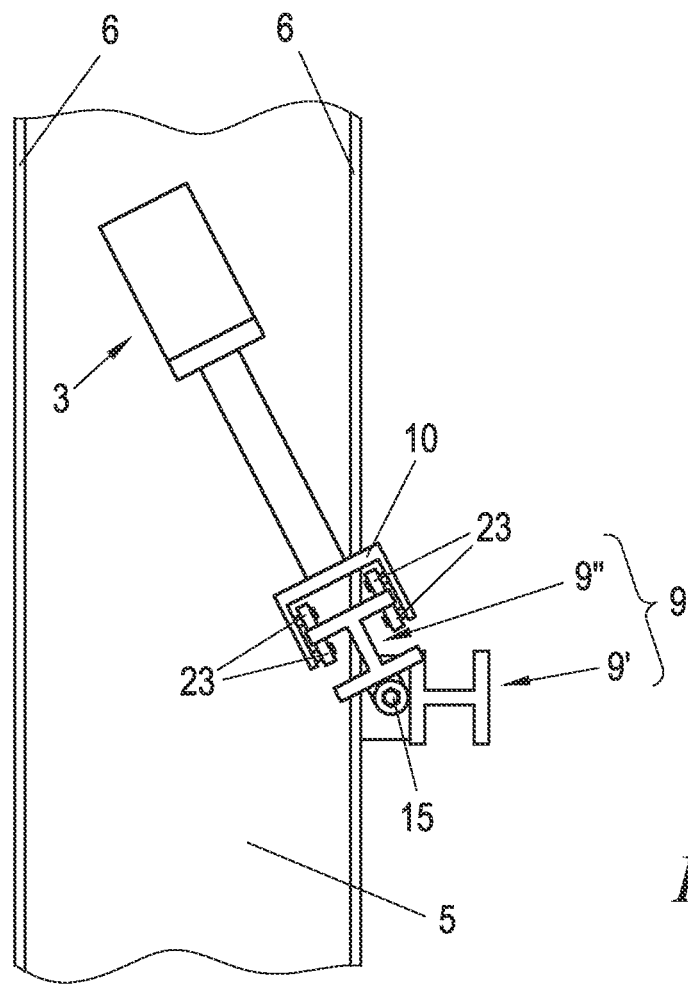

As is shown in FIGS. 2, 3a, and 3b, the guide rail 9 may be—although not necessarily—divided into two parts, and more particularly into a lower part 9', which is rigidly secured to the gantry 1 or the railing 6 thereof, and an upper part 9", which is pivotably connected, rotatably by 360° in an embodiment, to the lower part 9' by way of a pivot connection 14. The pivot connection 14 has a pivot axis 15 that is parallel to the longitudinal direction 12 of the guide rail 9. As is shown in FIGS. 3a and 3b, the upper part 9" of the guide rail 9 can thus be pivoted from a position that is aligned with the lower part 9' (FIG. 3a) into a maintenance position that is rotated over the railing 6 and the catwalk 5 (FIG. 3b). If—as will be described in greater detail below—the carriage 10, together with the component 3, is located on the upper part 9", the component 3 can be moved into the secure working area of the user on the catwalk 5 for maintenance, cleaning and adjustment purposes.

In the embodiment shown, the cross-section of the guide rail 9, or the parts 9', 9" thereof, has a double-T profile ("H-profile"), wherein the limbs 16, 17 of the one T form two of the flanges facing away from the gantry 1 for the carriage 10 to roll on, and the limbs 18, 19 of the other T form two mounting strips for securing to the gantry 1 or the railing 6, for example for the engagement of the anchor bracket and anchoring pins 13. The flanges 18, 19 can also be used to anchor the pivot connection 14, which comprises mounting brackets 20, 21 for mounting a pivot pin 22. The rotational axis 15 of the pivot connection 14 is thus located outside the guide rail 9, which extends the effective swivel arm during pivoting (FIGS. 3a and 3b) and thereby improves reachability of the component 3 in the maintenance position (FIG. 3b).

The carriage 10 is guided in a sliding manner on the guide rail 9, or more precisely on the outer flanges 16, 17. To this end, the carriage 10 can support at least three, four, or more roller pairs 23, which each engage a flange 16, 17 between each other and roll thereon, which is to say two (mutually spaced) roller pairs 23 for the one flange 16 and two (mutually spaced) roller pairs 23 for the other flange 17. The carriage 10 forms a mounting platform 24 for attaching the component 3, for example by way of appropriate mounting brackets 25, which can be anchored in boreholes of the platform 24 by way of screws 26.

Using a pull cable 27, which engages on an eyelet 27" of the carriage 10 by way of a carabiner 27' for example, a user on the catwalk 5 can move the carriage 10 from a mounting position that is lowered onto the lower part 9' into a maintenance position that is raised onto the upper part 9", and vice versa. For operating the pull cable 29, the upper end of the guide rail 9 may carry a block and tackle, a deflection roller 28 and/or a winding drum 29, which can be actuated by an electric motor or a crank 30 so as to wind up and unwind the pull cable 27. The pull cable 27 is a steel wire or cable, for example, however variants such as chains, plastic cables or the like are also covered.

In the lowered position, the carriage 10 is supported downward and secured by the limit stop 11. The limit stop 11 can be fixed on the guide rail 9 at any arbitrary height and thereby defines the lower final position of the carriage 10, and thus the mounting height of the component 3. Beneath the limit stop 11, at the lowest end of the guide rail 9, the rail can additionally be provided with a stopper 31 so as to basically act as a "retainer" during mounting, preventing the limit stop 11 or carriage 9 from sliding downward.

FIGS. 5a and 5b show an embodiment of the limit stop 11 in detail. By way of two L- or U-shaped lugs 32, the limit stop 11 embraces the flanges 16, 17 of the guide rail 9 and slides thereon with play. The play can be locked at any time using a clamping element, for example a screw or the like, mounted movably on the limit stop 11, so as to clamp the limit stop 11 at the desired height. The clamping element may be formed by two wedges 33 as shown, which on the one wedge side 34 can be seated against the guide rail 9 and on the other wedge side 35 slide along an oblique inner surface 36 of the limit stop 11 and are penetrated by a tension screw 37. Due to tightening of the tension screw 37, the wedge 33 slides upward and along the oblique surface 36, whereby the wedge is basically driven between the outer side of the guide rail 9 (or the flanges 16, 17 thereof) and the inner surface 36 of the limit stop 11.

The tension screws 37 of the wedges 33 may be accessed from the top side 38 of the limit stop 11 and can be actuated by the operating person on the catwalk 5, for example by way of a long wrench. The limit stop 11 has an eyelet 39 for this purpose, through which a holding rope can be temporarily guided so as to lower the limit stop 11 to the desired height, whereupon the tension screws 37 are tightened in order to clamp the limit stop 11 at this height. The holding rope guided through the eyelet 39 can then be removed.

Thereafter, one or more carriages 10 can be threaded onto the guide rail 9 or the flanges 16, 17 thereof and lowered by way of the pull cable 27 until these are seated on or strike against the limit stop 11.

The seat between the carriage 10 and the limit stop 11 can be defined in terms of the position thereof in the lateral direction by way of a centering coupling 40. The centering coupling 40 comprises, for example, a conical, truncated cone-shaped, centering pin 41 on one of the parts that are the carriage 10 and the limit stop 11, and a matching centering hole 42 on the respective other part. It is further possible to provide more than one centering coupling 40 between a carriage 10 and the limit stop 11 (not shown), so as to define the angular position between these.

It is also possible to center or orient a plurality of carriages 10 that are located on top of one another with respect to each other by way of interposed centering couplings 40, as is shown in FIG. 4. To this end, the centering coupling 40 can additionally comprise a centering spacer pin 43, which extends the centering pin 41 and engages in the centering hole 42 of the respective other part.

If the component 3, for example a laser scanner 3", is to be secured in the upper part 9" of the guide rail 9, which is to say it does not have to be lowered, it is also possible, instead of a limit stop 11, to use another device for fixing the height of the carriage 10 on the guide rail 9, for example the carriage 10 can be screwed on directly at the desired height of the guide rail 9 or fixed by way of a holding plate that is screwed onto the guide rail 9.

Conclusion

The invention is not limited to the shown embodiments, but encompasses all variants and modifications that are covered by the scope of the accompanying claims. While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the described embodiments should not be limited by any of the above-described exemplary embodiments, but should be defined only in accordance with the following claims and their equivalents.

What is claimed is:

1. A device for suspending at least one component from a roadway gantry, having a catwalk comprising:
    a guide rail that can be secured on the gantry in an approximately vertical orientation;
    a carriage, which is guided on the guide rail in a sliding movable manner and on which the at least one component can be mounted; and
    a limit stop, which is mounted on the guide rail beneath the carriage in a height-adjustable manner;
    wherein the guide rail is divided into a lower part and an upper part, which are connected to each other by way of a pivot connection having a pivot axis parallel to the longitudinal direction of the guide rail whereby the upper part of the guide rail and the component can be rotated to within reach of the catwalk.

2. The device according to claim 1, wherein the pivot axis of the pivot connection is located outside the guide rail, so that the lower part and the upper part can be pivoted in and out of alignment.

3. The device according to claim 1, wherein an upper end of the guide rail carries a block and tackle and/or a winding drum for a pull cable engaging on the carriage.

4. The device according to claim 1, wherein the guide rail comprises at least two laterally protruding flanges, and the limit stop comprises at least two L- or U-shaped lugs, which embrace the flanges with play, the limit stop including at least one movable clamping element for locking the play.

5. The device according to claim 4, wherein the clamping element is a wedge, which is linearly guided in the limit stop so as to be seated against the guide rail and which is penetrated by a tension screw, which drives the wedge between a surface of the limit stop and the guide rail upon tightening.

6. The device according to claim 5, wherein the tension screw can be accessed from the top side of the limit stop.

7. The device according to claim 1, wherein the guide rail comprises at least two laterally protruding flanges, and the carriage comprises at least four roller pairs, of which two pairs engage one flange and two pairs engage the other flange, respectively, and roll thereon.

8. The device according to claim 4, wherein a cross-section of the guide rail is a double-T profile, limbs of the one T forming the two flanges and limbs of the other T being securable to the gantry.

9. The device according to claim 1, wherein one of the carriage or the limit stop has at least one centering hole, and the other of the carriage or the limit stop has at least one centering pin, which can be engaged in the hole.

10. The device according to claim 9, wherein the centering pin is truncated cone-shaped.

11. The device according to claim 9, wherein the centering pin is obliquely positioned.

12. The device according to claim 1, wherein the carriage can be coupled to an additional carriage by way of a centering coupling.

13. An apparatus for suspending at least one component from an using a suspending device, comprising:
    a gantry having a catwalk;
    a guide rail secured on the gantry in an approximately vertical orientation;

a carriage, which is guided on the guide rail in a sliding movable manner and on which the at least one component can be mounted; and a limit stop, which is mounted on the guide rail beneath the carriage in a height-adjustable manner;

wherein the guide rail is divided into a lower part and an upper part, which are connected to each other by way of a pivot connection having a pivot axis parallel to the longitudinal direction of the guide rail whereby the upper part of the guide rail and the component can be rotated to within reach of the catwalk.

14. The apparatus according to claim 13, wherein the catwalk is secured by a lateral railing, wherein the guide rail runs vertically downward outside the railing.

15. The apparatus according to claim 14, wherein the pivot connection is located at or above the height of the railing.

16. The apparatus according to claim 13, wherein the gantry spans a road, and a camera, a radar device or a laser scanner for monitoring traffic is mounted on the carriage.

17. The apparatus according to claim 13, wherein the pivot connection enables the carriage to be pivoted into a position that faces a user on the gantry.

18. The apparatus according to claim 13, wherein the pivot axis of the pivot connection is located outside the guide rail, so that the lower part and the upper part can be pivoted in and out of alignment.

19. A method for suspending at least one component from a roadway gantry, having a catwalk, comprising:

securing a guide rail on the gantry in an approximately vertical orientation;

providing at least one carriage configured to mount the at least one component mounted thereon guiding a carriage on the guide rail in a sliding movable manner providing a limit stop mounted on the guide rail beneath the carriage in a height-adjustable manner to adjust the height of the at least one component;

wherein the guide rail is divided into a lower part and an upper part, which are connected to each other by way of a pivot connection having a pivot axis parallel to the longitudinal direction of the guide rail, whereby the upper part of the guide rail and the component can be rotated to within reach of the catwalk.

20. The method according to claim 19, further comprising:

enabling the lower part and the upper part to be pivoted in and out of alignment by a pivot axis of the pivot connection being located outside the guide rail.

* * * * *

UNITED STATES PATENT AND TRADEMARK OFFICE
CERTIFICATE OF CORRECTION

| | | |
|---|---|---|
| PATENT NO. | : 9,249,928 B2 | Page 1 of 1 |
| APPLICATION NO. | : 13/946472 | |
| DATED | : February 2, 2016 | |
| INVENTOR(S) | : Arnold Trogl et al. | |

It is certified that error appears in the above-identified patent and that said Letters Patent is hereby corrected as shown below:

In the claims
In column 6, line 9, in claim 1, after "catwalk" insert -- , --.

Signed and Sealed this
Third Day of May, 2016

Michelle K. Lee
*Director of the United States Patent and Trademark Office*